US012554649B2

United States Patent
Li et al.

(10) Patent No.: US 12,554,649 B2
(45) Date of Patent: Feb. 17, 2026

(54) PROFILE GUIDED MEMORY TRIMMING

(71) Applicant: Google LLC, Mountain View, CA (US)

(72) Inventors: Xinliang David Li, Palo Alto, CA (US); Christopher Thomas Kennelly, Croton-on-Hudson, NY (US); Sotirios Apostolakis, West Windsor, NJ (US); Parthasarathy Ranganathan, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/769,631

(22) Filed: Jul. 11, 2024

(65) Prior Publication Data

US 2025/0298747 A1    Sep. 25, 2025

(30) Foreign Application Priority Data

Mar. 21, 2024  (GR) .............................. 20240100208

(51) Int. Cl.
G06F 12/0891 (2016.01)
G06F 12/0871 (2016.01)
G06F 12/0895 (2016.01)

(52) U.S. Cl.
CPC ...... *G06F 12/0891* (2013.01); *G06F 12/0871* (2013.01); *G06F 12/0895* (2013.01)

(58) Field of Classification Search
CPC ............. G06F 12/0871; G06F 12/0891; G06F 12/0895
See application file for complete search history.

(56) References Cited

U.S. PATENT DOCUMENTS

| | | |
|---|---|---|
| 5,375,216 A | 12/1994 | Moyer et al. |
| 6,249,845 B1 | 6/2001 | Nunez et al. |
| 8,132,158 B2 | 3/2012 | Wang et al. |
| 8,490,065 B2 | 7/2013 | Archambault et al. |
| 10,365,930 B2 | 7/2019 | Nickolls et al. |
| 10,761,979 B2 | 9/2020 | Wilkinson et al. |
| 2005/0081019 A1 | 4/2005 | DeWitt et al. |
| 2006/0224793 A1* | 10/2006 | Purlia .................. G06F 16/185 |

(Continued)

OTHER PUBLICATIONS

Extended European Search Report for Euorpean Patent Application No. 24194861.1 dated Feb. 3, 2025. 7 pages.

(Continued)

*Primary Examiner* — Aracelis Ruiz
(74) *Attorney, Agent, or Firm* — Lerner David LLP

(57) ABSTRACT

The technology is generally directed to defining an instruction for removing dead data and the related memory traffic from the cache. By defining and inserting the instruction, the cache of a computer system is optimized. The memory traffic of the cache may be optimized based on a data allocation/deallocation profile. The profile may be generated and used to determine what memory traffic incurred by the cache can be trimmed. In some examples, the profile may be generated for an allocation sample, such as from a job being executed by a computer system. The profile is then used to determine an initialization and reuse pattern of the allocation region for the job. Based on the profile, a creation and eviction strategy for the underlying cache lines can be determined and used to generate an instruction that trims the read from main memory or the upper level cache for a cache line.

20 Claims, 9 Drawing Sheets

(56) References Cited

U.S. PATENT DOCUMENTS

| | | |
|---|---|---|
| 2013/0054923 A1 | 2/2013 | Bradley et al. |
| 2020/0327040 A1 | 10/2020 | Booth et al. |
| 2020/0409711 A1 | 12/2020 | Constable et al. |
| 2023/0109831 A1* | 4/2023 | Flaishman ............ G06F 3/0605 |
| | | 711/112 |

OTHER PUBLICATIONS

Kharbutli et al., "Counter-Based Cache Replacement Algorithms", IEEE Xplore, To appear in the Proceedings of the International Conference on Computer Design, San Jose, Oct. 2-5, 2005, Nov. 2005, 10 pages.

Jaleel et al., "High Performance Cache Replacement Using Re-Reference Interval Prediction (RRIP)", ISCA'10, Jun. 19-23, 2010, Saint-Malo, France, 12 pages.

Duong et al., "Improving Cache Management Policies Using Dynamic Reuse Distances", 2012 IEEE/ACM 45th Annual International Symposium on Microarchitecture, 12 pages.

Koo et al., "Access Pattern-Aware Cache Management for Improving Data Utilization in GPU", ISCA '17, Jun. 24-28, 2017, Toronto, ON, Canada, 13 pages.

Gaur et al., "Bypass and Insertion Algorithms for Exclusive Last Level Caches", ISCA'11, Jun. 4-8, 2011, San Jose, California, USA, 12 pages.

* cited by examiner

PROFILE GUIDED MEMORY TRIMMING

CROSS-REFERENCE TO RELATED APPLICATIONS

The present application claims priority from Greek Patent Application No. 20240100208, filed Mar. 21, 2024, the disclosure of which is hereby incorporated herein by reference.

BACKGROUND

In data center workloads, a large percentage of memory traffic is typically wasted on transmitting dead data between the cache and main memory. Typical sources of dead data and the related memory traffic are uninitialized values in newly allocated memory blocks with cache-store-misses, values in the memory block with no further use until the end of the object/memory lifetime, values in the memory block with no further use until they are overwritten, or the like.

BRIEF SUMMARY

The technology is generally directed to defining an instruction for removing dead data and the related memory traffic from the cache. By defining and inserting the instruction, the cache usage or cache utilization of a computer system is optimized. For example, the memory traffic of the cache may be optimized based on a data allocation/deallocation profile. The profile may be generated and used to determine what memory traffic incurred by the cache can be trimmed. In some examples, the profile may be generated for an allocation sample, such as from a job being executed by a computer system. The profile is then used to determine an initialization and reuse pattern of the allocation region for the job. Based on the profile, a creation and eviction strategy for the underlying cache lines can be determined. The creation and eviction strategy are used to generate an instruction that trims the read from main memory or the upper-level cache for a cache line.

One aspect of the technology method for managing utilization of a cache within a computer system comprising a plurality of processors. The method comprises generating, by a profiler executed by one or more processors, a first A/D profile for an allocation callstack being executed by the computer system, wherein the first A/D profile corresponds to a first-write and re-allocation memory distance, determining, by the one or more processors based on the first A/D profile, an allocation and eviction strategy of a cache line for the allocation callstack, and trimming, by the one or more processors based on the allocation and eviction strategy, the cache line.

Generating the first A/D profile further comprises receiving, by the one or more processors, an allocation sample associated with the allocation callstack, recording, by the one or more processors based on the allocation sample, a timestamp, and determining, by the one or more processors, a maximum offset corresponding to a maximum number of blocks initialized during a threshold period of time. An allocated region of the cache line comprises an initial number of blocks, and trimming, by the one or more processors, the initial number of blocks to the maximum number of blocks by allocating a number of blocks without reading from main memory. The method may further comprise protecting, by the one or more processors, a memory page, and installing, by the one or more processors, a page fault handler. The method may further comprise unprotecting, by the one or more processors upon execution of an application accessing the cache, the memory page, comparing, by the one or more processors, a current timestamp with the recorded timestamp to determine a lapsed period of time, and when the lapsed period of time is greater than a threshold, recording by aggregating, by the one or more processors, the maximum number of, or when the lapsed period of time is less than the threshold, generating, by the one or more processors, a second A/D profile for the allocation callstack. Generating the second A/D profile for the allocation callstack, further comprises determining, by the one or more processors, an updated maximum offset, re-protecting, by the one or more processors, the memory page, and re-installing, by the one or more processors, the page fault handler. The method may further comprise generating, by the profiler executed by the one or more processors, one or more additional A/D profiles for the allocation callstack, each of the one or more additional A/D profiles including the maximum number of blocks initialized during a threshold period of time, and aggregating, by the one or more processors, the maximum number of blocks for the first A/D profile and the respective maximum number of blocks for the one or more additional A/D profiles.

Generating the A/D profile further comprises receiving, by the one or more processors, an allocation sample associated with an allocation callstack, recording, by the one or more processors based on the allocation sample, a timestamp, and determining, by the one or more processors, a bitmask for the allocation sample. A bit in the bitmask corresponds to one cache line per allocation, and determining the bitmask for the allocation sample comprises identifying, by the one or more processors, a first-write distance for a byte block in a memory region, and allocating, by the one or more processors, one bit in the bitmask for each byte block. The first-write distance corresponds to a number of cache lines accessed by an application before a first-write of a block since receiving the allocation sample. An allocated region of the cache line comprises an initial number of blocks, and trimming the cache line comprises trimming, by the one or more processors based on the bitmask, the initial number of blocks to a reduced number of blocks. The method may further comprise protecting, by the one or more processors, the memory page, and installing, by the one or more processors, a page fault handler. The method may further comprise unprotecting, by the one or more processors upon execution of an application accessing the cache, comparing, by the one or more processors, a current timestamp with the recorded timestamp to determine a lapsed period of time, and when the lapsed period of time is greater than a threshold, recording, by the one or more processors, the bitmask, or when the lapsed period of time is less than the threshold, determine, by the one or more processors, a bit index. The method may further comprise generating, by the profiler executed by the one or more processors, one or more additional A/D profiles for the allocation callstack, each of the one or more additional A/D profiles including a respective bitmask, and aggregating, by the one or more processors, the bitmask for the first A/D profile and the respective bitmasks for the one or more additional A/D profiles.

The method may further comprise receiving, by the one or more processors, an allocation sample associated with an allocation callstack, associating, by the one or more processors using a bit in a bit address of the allocation sample, a tag with the allocation sample, the tag indicating the allocation was sampled, updating, by the one or more processors, metadata associated with the sampled allocation sample, and providing, by the one or more processors, the tagged bit address to a free list to be reallocated. The metadata is updated to include a cache miss counter value or a timestamp of when the allocation is deallocated. The method may further comprise determining, by the one or more processors, a memory distance proxy metric, and aggregating, by the one or more processors, the memory distance proxy metric to a deallocation site. The memory distance proxy metric corresponds to a time between deallocation and reallocation of the allocation sample.

Another aspect of the disclosure is directed to a system comprising one or more processors. The one or more processors may be configured to generate, by executing a profiler, a first A/D profile for an allocation callstack being executed by a computer system, wherein the A/D profile corresponds to a first-write and re-allocation memory distance, determine, based on the first A/D profile, an allocation and eviction strategy of a cache line for the allocation callstack, and trim, based on the allocation and eviction strategy, the cache line.

Yet another aspect of the disclosure is directed to one or more non-transitory computer-readable storage media encoding instructions that, when executed by one or more processors, cause the one or more processors to perform operations comprising generating, using a profiler, a first A/D profile for an allocation callstack being executed by a computer system, wherein the A/D profile corresponds to a first-write and re-allocation memory distance, determining, based on the first A/D profile, an allocation and eviction strategy of a cache line for the allocation callstack, and trimming, based on the allocation and eviction strategy, the cache line.

DETAILED DESCRIPTION

Figure 1:
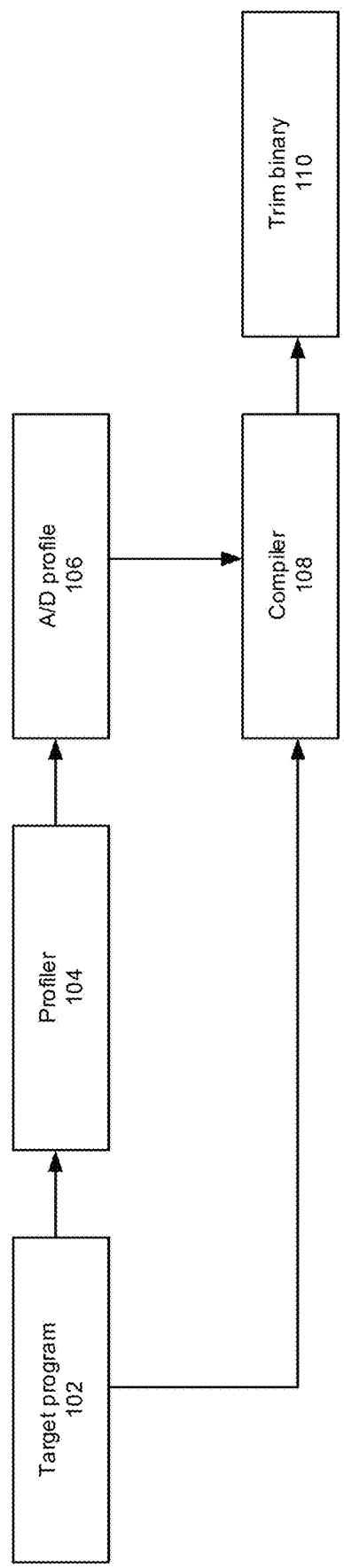
FIG. 1 is a flow diagram of an example method for trimming a binary, e.g., a binary according to aspects of the disclosure.

The technology is generally directed to optimizing a cache of a computer system by defining an instruction to remove dead data and the related memory traffic from the cache. Dead data may include, for example, uninitialized values in newly allocated memory blocks, values in a memory block with no further use until the end of the object, memory, and/or program lifetime, values in the memory block with no further use until they are overwritten, or the like. The memory traffic may be optimized by using a data allocation/deallocation ("A/D") profile ("A/D profile") that can determine what memory traffic incurred by cache coherence protocol can be trimmed. Trimming the data may include, for example, evicting the dead cache line without writeback.

For example, the A/D profile may be generated for an allocation sample. The allocation sample may be from a job being executed by the computer system. The A/D profile may be used to determine the initialization and reuse pattern of the allocated region for a given job being executed by the computer system. Based on the profile, the creation and eviction strategy for the underlying cache lines can be determined. Trimming the read from the main memory or the upper-level cache for a cache line based on the maximum initialization offset and/or initialization bitmask reduces the memory fetch traffic and the amount of cache pollution. Further, trimming minimizes dead memory traffic by avoiding both memory fetches of unutilized data and writebacks of dead data.

A computer system includes a processor(s), main memory, and one or more levels of caches. Usage of the cache may be measured by the unique number of cache lines accessed by an application between two event points. Typically, it is difficult to measure the number of uniquely accessed cache lines without incurring heavy profiling overhead. To increase the computational efficiency of the system and, thereby, reduce processing and network overhead, the computer system includes a profiler that can be used to determine the maximum offset and/or bitmask for a given allocation sample associated with an allocation callstack. In particular, the profiler uses allocation samples, instead of profiling each allocation being executed by the computer system. Using a sampling approach reduces the computational resources as compared to profiling each job being executed by the computer system. However, as a computer system typically executes hundreds, thousands, or even millions of jobs across multiple machines and/or computers, generating an A/D profile for a sampling of the jobs provides enough data to accurately determine how and when to optimize the cache. Optimizing the cache usage by removing dead data from the cache improves program performance by reducing memory traffic.

The dead data is removed based on the instructions generated by a compiler. The instructions are based on how much of the allocation is being used. A first instruction may be to install, or allocate, a new cache line with zero content without performing a memory fetch. The first instruction may take two operands: the first cache block address and the number of cache blocks to be installed.

A second instruction may be similar to the first instruction except that the second instruction takes an additional operand: a bitmask. Each bit in the mask represents one 64-byte block. If the value is 1, the hardware will install the cache line for the corresponding memory block.

A third instruction may be to instruct the processor that the data of the cache blocks have ended their lifetime. The third instruction may have three operands: start block address, number of cache blocks, and the action type. The action type can be an invalidation or an "undirty." The invalidation action type may invalidate the cache line. The undirty action type may keep the block in the cache, but clear the dirty bit(s), if present. Dirty bits are meta data bits indicating the cache block status. After the bit is cleared, the cache block no longer needs to be written back to main memory. For example, a cache line being in a dirty state indicates that the cache line has been modified from the value in main memory. Typically, in such an example, the ache line would have to be written back. However, when a cache line address is logically deallocated, the contents of the cache line become irrelevant. The bits of the cache line can be cleared to avoid a logically unnecessary writeback.

The instructions may be inserted from the memory allocation functions malloc/free, or new/delete operators. However, the compiler must determine the right operand values for the following reasons: not all memory blocks allocated by a malloc/new call are initialized, so blindly installing cache blocks for all of them will result in cache pollution (i.e., evicting other useful lines); delayed initialization, as not all memory blocks allocated by a malloc/new call are initialized immediately after the allocation. Cachelines installed for those blocks are likely to be evicted before they are used, resulting in wasted installation and cache pollution; and many deallocated/freed memory blocks are likely to be re-allocated quickly with a FIFO style memory allocator. For those blocks, selecting the undirty action may be preferred over invalidation.

The technology disclosed herein provides an A/D profile-guided approach for trimming dead memory traffic for improved application performance. For example, the technology includes a method of profiling the first-write-memory distance, e.g., distribution, for the memory blocks of newly allocated objects. The first-write-memory-distance profile can be used to guide the compiler to decide the address range for cache installation without polluting the cache. Another aspect of the technology includes profiling the re-allocation distance for deallocated objects. Re-allocation-distance for a deallocation site (with callstack context) is defined as the number of unique cache lines (distribution) accessed by the program before the freed object is reallocated since its previous deallocation operation. This profile information can be used to guide the compiler to decide the action type (invalidation or un-dirty) for the newly freed object.

Memory, or cache, distance is measured by the unique number of cache lines accessed by the program between two event points. It is difficult to measure memory distance without incurring heavy profiling overhead. In profile-guided optimizations, the memory distance profile data is usually used to compare with the cache size (at a given level). The normalized memory distance is the ratio of the memory distance over the cache size. When the normalized memory distance is over a given threshold, the working set during the time window (between two program points) is considered too large to fit in the cache.

The technology disclosed herein replaces the normalized memory distance with a proxy metric. The proxy metric corresponds to the number of cache misses in the time window. According to some examples, the following equation may be used to determine the proxy metric:

$$NormMemDistProxy = \frac{\text{Time Elapsed In Cycles}}{\text{Cycles Per Cache Miss}} = \frac{(CacheMiss.MPKI) * AvgIPC * (\text{Time Elapsed In Cycles})}{1000}$$

In this equation, "CacheMiss.MPKI" corresponds to the number of cache misses per thousand instructions, "AvgIPC" corresponds to the average number of instructions per cycle, and "Cycles Per Mache Miss" corresponds to the inverse of "CacheMisses" per cycle. "CacheMiss.MPKI" and "AvgIPC" are workload dependent parameters. To measure the workload dependent parameters, the profiler measures the number of clock ticks between two program points. The measurements may be scaled by a predetermined factor depending on the intended precision of the measurements.

FIG. 1 is a flow diagram of an example method for trimming a binary, e.g., a binary. The following operations do not have to be performed in the precise order described below. Rather, various operations can be handled in a different order or simultaneously, and operations may be added or omitted.

The profiler 104 may receive a target program 102. The target program 102 corresponds to a job being executed by a computing device. Each target program 102 can be optimized according to its profile-specific information. The profiler 104 is configured to determine the profile-specific information, such as an A/D profile 106. In some examples, the A/D profile 106 may be determined based on a maximum offset of the bytes that are initialized within a limit of a first-write memory distance. The first-write memory distance may correspond to a number of cache lines accessed by an application before a first-write of a block since receiving the allocation sample. In another example, the A/D profile 106 may be determined based on a bitmask. The bitmask tracks if a block is initialized within a threshold period of time or untimely. If a block is initialized timely, the corresponding bit in the bitmask is set when the first-write distance of a profiled block is less than the threshold distance.

The A/D profile 106, whether the max-offset profile or the bitmask profile, is provided as input into a compiler 108. The compiler 108 is configured to augment the binary at specific allocation sites, based on the A/D profile 106 of the target program 102, and provides information through an instruction about how much of the allocation gets used. Based on the information determined by the compiler 108, the binary is optimized. When the optimized binary is run, the dead memory traffic from the affected cache lines will be trimmed 110.

As used herein, dead data may include data that corresponds to deallocated memory. Dead writeback may correspond to a cache line writeback of dead data. According to some examples, writebacks may correspond to last-level-cache ("LLC") writebacks to memory. Dead fetch-on-miss may correspond to a cache line fetch from memory of full-uninitialized data due to an LLC write miss. Dead memory traffic corresponds to the total count of bytes transferred between LLC and memory for dead writebacks and fetches. Install cache line means to directly place a cache line corresponding to newly allowed memory locations into a cache without inducing a write cache miss and a memory fetch.

Figure 2:
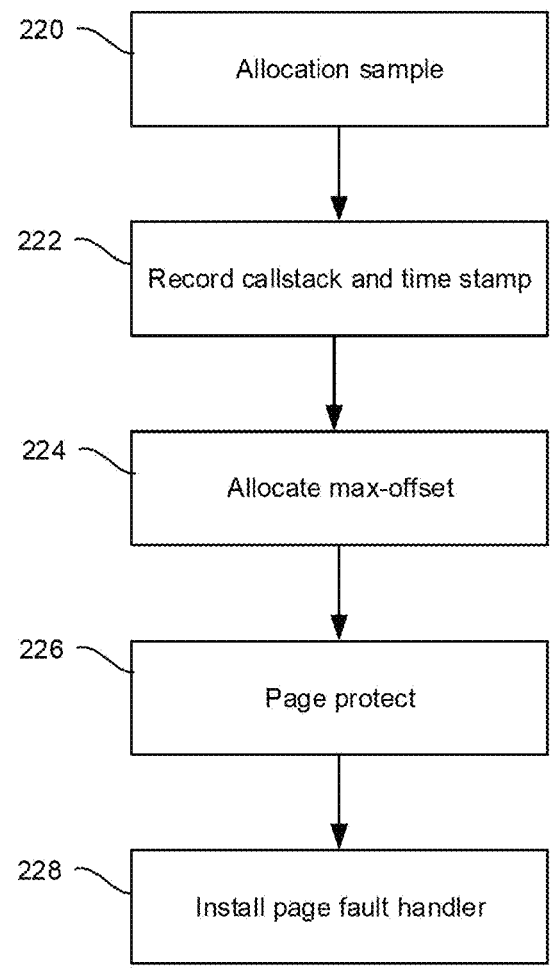
FIG. 2 is a flow diagram for an example method of initializing the profiler based on a maximum offset data allocation/deallocation profile according to aspects of the disclosure.

FIG. 2 is a flow diagram for an example method of initializing the profiler based on a maximum offset A/D profile. The following operations do not have to be performed in the precise order described below. Rather, various operations can be handled in a different order or simultaneously, and operations may be added or omitted.

As discussed with respect to FIG. 1, a profiler 104 may be configured to generate an A/D profile 106. The A/D profile 106 may, in some examples, be a first-write memory distance profile. The first-write memory distance profile may, in some examples, be a maximum offset. The A/D profile 106 is provided as input into the compiler 108 to determine an address range for cache installation. The A/D profile 106 may prevent pollution of the cache.

In block 220, the profiler 104 selects an allocation sample associated with a given call stack. The profiler generates an A/D profile 106 for the allocation sample based on the maximum offset of the bytes that are initialized within a limit of the first-write memory distance. In block 222, for each allocation sample, the profiler 104 records a time stamp. The timestamp may correspond to when the sample was selected. The call stack associated with the allocation sample may additionally be recorded.

The profiler 104 may allocate a counter to track the maximum offset accessed in the allocation. For example, each allocation region may include an initial number of blocks. The maximum offset corresponds to the block furthest from the start of the allocated region that is initialized within a limit of first-write-memory distance.

The maximum offset may be determined within a threshold period of time. The threshold period of time may be, for example, the time it takes for an application to access the cache before the first write of a block. In some examples, the threshold period of time may be a predetermined period of time. As an example, an allocated region may include 100 blocks. From time t0 to time t1 blocks 0 to 36 are written and at a later time t4 blocks 48 to 60 are written. The threshold period of time may be the time between t0 and t1. In such an example, the blocks used at time t4 may be untimely and, therefore, not included when determining the maximum offset. Continuing with this example, the maximum offset may be 36 blocks.

According to some examples, the threshold period of time may be a duration and/or limit such that, past the duration and/or limit, the memory distance is considered large. In this example, the memory distance may be determined based on the time elapsed. As the time elapsed becomes greater than the threshold, the memory distance is considered large. The greater the time elapsed is as compared to the threshold, the larger the memory distance is. The threshold may be compared with a time difference between a time "t" and a starting time. The time may, in some examples, correspond to the timestamp of when the sample was selected. If the time difference between the timestamp and the starting time is greater than the threshold, the sample may be considered untimely. An untimely sample is not included when determining the maximum offset.

In block 224, the target binary optimized by the profiler 104 can allocate a portion of the cache line corresponding to the maximum offset. For example, the allocated region may include an initial number of blocks, e.g., 100 blocks. The maximum offset may include a subset of the initial number of blocks, e.g., 36 blocks. The cache allocation instruction inserted by the compiler using the profile pre-allocates the subset of blocks, e.g., 36 blocks into the cache. The cache line pre-allocation eliminates the need to fetch from memory. Continuing with the example, if 36 blocks of the initial 100 blocks are allocated in the cache with 64 blocks trimmed. Selectively pre-allocating cache blocks increases the computer system's efficiency by minimizing the traffic associated with memory fetching and reducing cache pollution by not allocating cache blocks that are not timely used.

In block 226, after allocating and initializing the maximum offset, the profiler 104 protects the memory page. For example, the profiler 104 can page protect the region of the cache, e.g., the augmented cache line. In some examples, in block 228, the profiler 104 installs the page fault handler as part of the instructions.

Figure 3:
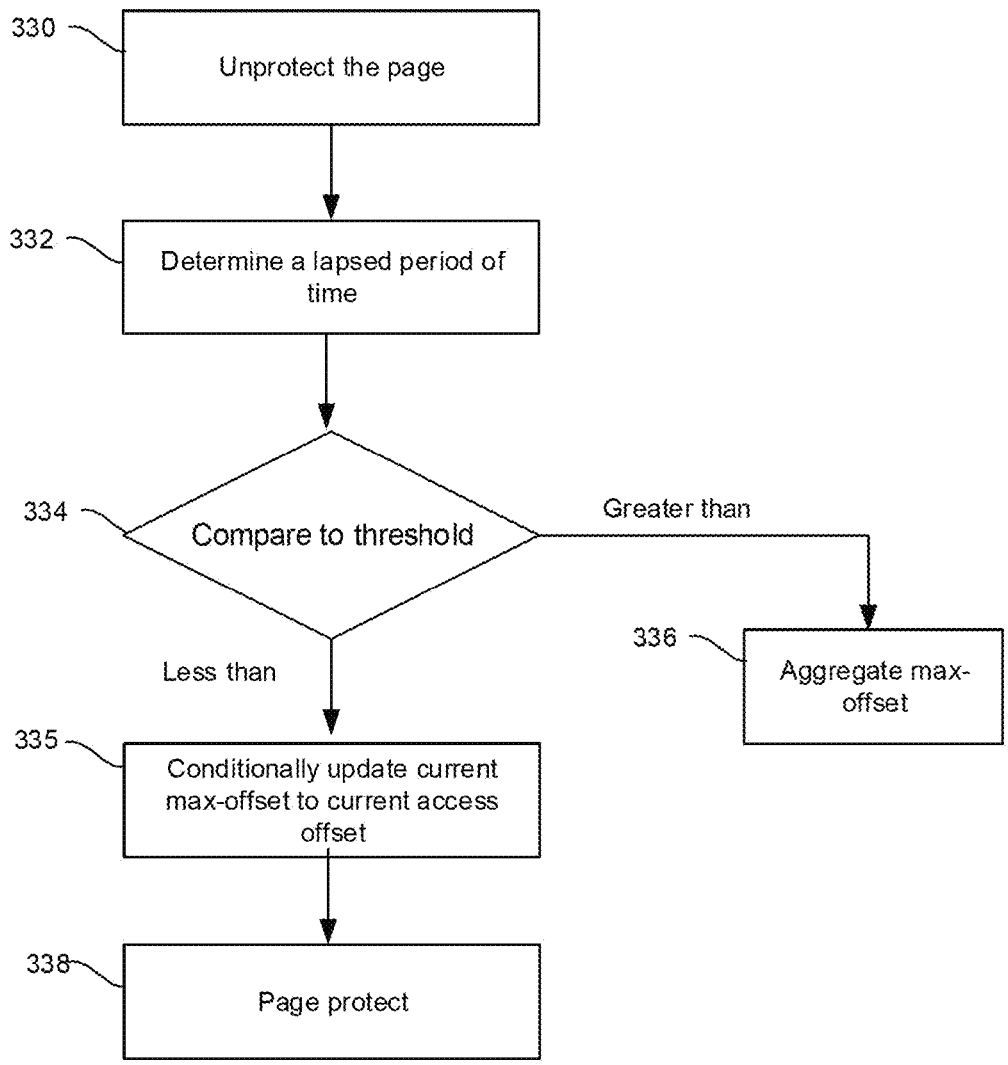
FIG. 3 is a flow diagram for an example method of executing a page fault handler based on a maximum offset data allocation/deallocation profile according to aspects of the disclosure.

FIG. 3 is a flow diagram for an example method of executing a page fault handler based on a maximum offset A/D profile. The following operations do not have to be performed in the precise order described below. Rather, various operations can be handled in a different order or simultaneously, and operations may be added or omitted.

In block 330, the page fault handler will unprotect the page when an application initially touches the memory. In block 332, the page fault handler may identify a timestamp associated with when the application touched the memory. The time stamp associated with when the application touched the memory may be compared to the timestamp of when the allocation sample was received. The comparison may be used to determine an amount of time that has lapsed between receiving the allocation sample and when the application touched the memory.

In block 334, the amount of time that has lapsed is compared to a threshold. If the amount of time that has lapsed is greater than the threshold, the maximum offset for the allocation sample no longer needs to be updated. Otherwise, the current maximum offset is updated to the current offset if the latter is larger.

In block 336, when the time threshold is reached, the recorded maximum offset is then aggregated with the maximum offset associated with the allocation stack. For example, if the offset of the allocation sample for is 36 blocks, but another maximum offset for a different allocation sample from the same allocation site is 42 blocks, the maximum offsets, e.g., 36 and 42 blocks, are aggregated. Aggregating the maximum offsets can include, for example, merging the maximum offsets by taking the mean, medium, mode, or the like. In some examples, the aggregate maximum offset is a running average, medium, or a histogram of the maximum offsets for the allocation callstack. The aggregate maximum offset is then recorded as the updated maximum offset for the allocation callstack.

In block 335, the current maximum offset may be compared to a current access offset. The current access offset is the distance, in bytes, from the current memory access to the start of the allocation. According to some examples, if the current access offset is greater than the current maximum offset, the current maximum offset may be updated to correspond to the current access offset.

In examples where the current maximum offset is less than the current access offset, the elapsed time may be compared to the threshold. If the elapsed time is still within the threshold, in block 338, the page fault handler may re-protect the page, e.g., the trimmed cache line. In such an example, the profiler may re-run to generate an updated A/D profile for the allocation sample, e.g., return to block 220 in FIG. 2.

Figure 4:
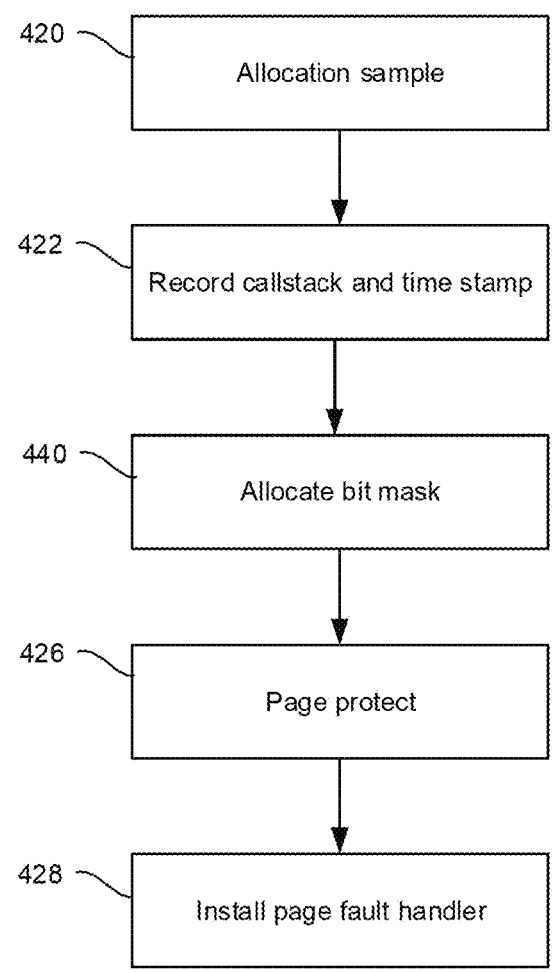
FIG. 4 is a flow diagram for an example method of initializing the profiler based on a bitmask data allocation/deallocation profile according to aspects of the disclosure.

FIG. 4 is a flow diagram for an example method of initializing the profiler based on a bitmask A/D profile. The following operations do not have to be performed in the precise order described below. Rather, various operations can be handled in a different order or simultaneously, and operations may be added or omitted.

In block 420, the profiler 108 selects an allocation sample associated with a given call stack. The profiler 104 generates an A/D profile for the allocation sample based on when a block within the allocation sample is initialized. The A/D profile 106 may be a per-block first-write distance profile. The per-block first-write distance profile may, in some examples, be a bit mask profile such that the A/D profile 106 is a bit mask. The bit mask is used to track if a block within the allocation sample is initialized within the threshold period of time or after the threshold period of time has lapsed. If the first-write distance of a profiled block is initialized within the threshold period of time, the corresponding bit in the bit mask for the block is set. The bit mask corresponds to all blocks for each allocation.

As an example, each allocation sample may have a reach of 4k. For each 64 byte memory region within the allocation sample a bit for the bit mask may be allocated. When the profiler determines that the block, e.g., the 64 byte memory region, has been initialized within the threshold period of time, the bit mask for that block is set.

In block 422, for each allocation sample, the profiler 104 records a time stamp. The time stamp may correspond to when the sample was selected. The call stack associated with the allocation sample may additionally be recorded.

In block 440, a bitmask is allocated. Allocating a bitmask includes creating a bitmask variable for profiling purposes.

After the sampled allocation, in block 426, the profiler 104 protects the memory pages associated with the allocated region. The profiler may, in block 428, also install the page fault handler.

Figure 5:
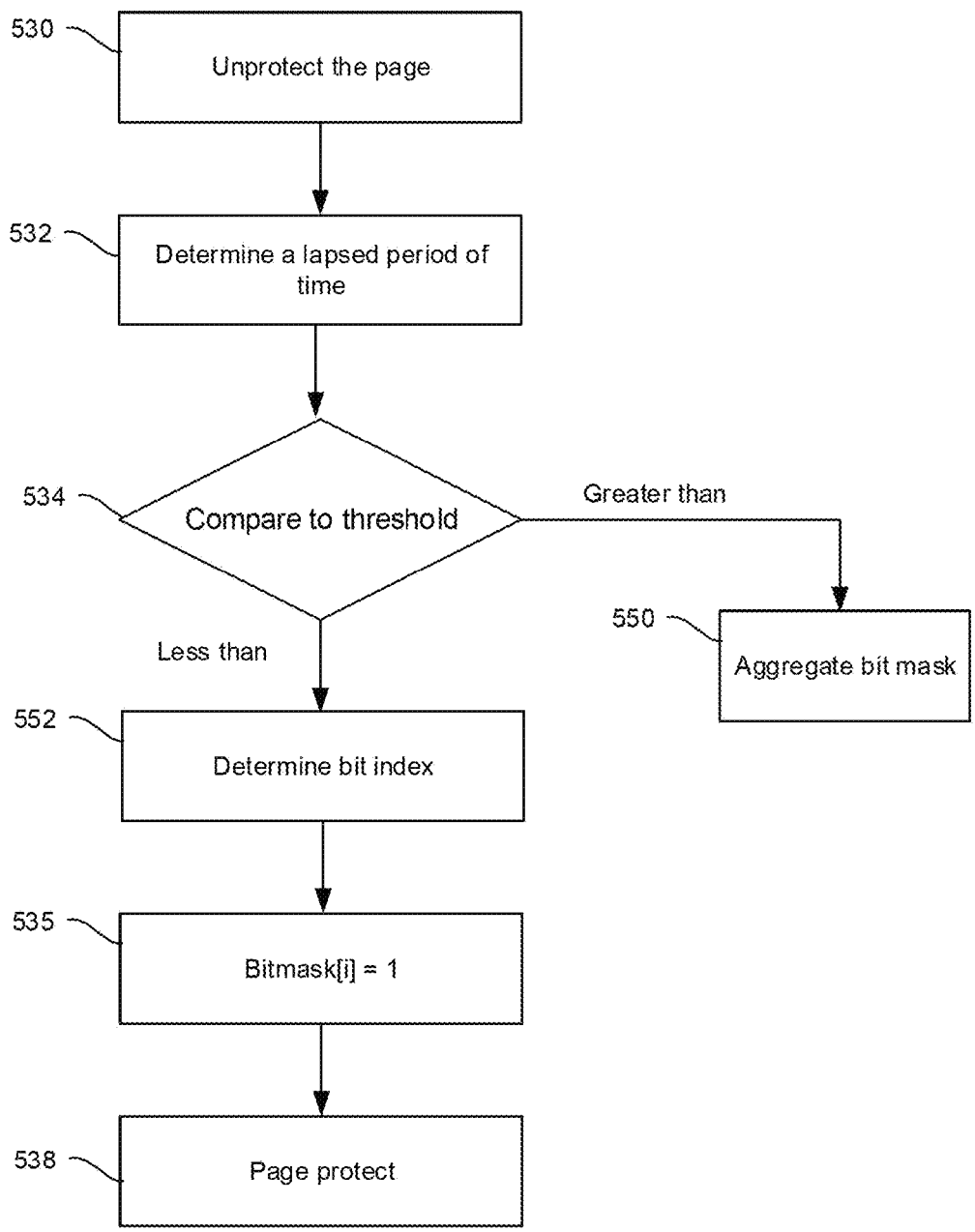
FIG. 5 is a flow diagram for an example method of executing a page fault handler based on a bit mask data allocation/deallocation profile according to aspects of the disclosure.

FIG. 5 is a flow diagram for an example method of executing a page fault handler based on a bit mask A/D profile. The following operations do not have to be performed in the precise order described below. Rather, various operations can be handled in a different order or simultaneously, and operations may be added or omitted.

In block 530, the page fault handler will unprotect the page when an application initially touches the memory. In block 532, the page fault handler may identify a timestamp associated with when the application touched the memory. The time stamp associated with when the application touched the memory may be compared to the timestamp of when the allocation sample was received, e.g., the time stamp recorded in block 422. The comparison may be used to determine an amount of time that has lapsed between receiving the allocation sample and when the application touched the memory.

In block 534, the amount of time that has lapsed is then compared to a threshold. If the amount of time that has lapsed is greater than a threshold, the bit mask for the allocation sample no longer needs to be tracked. Rather, the bit mask that was generated for the allocation sample is recorded. In some examples, in block 550, the recorded bit mask is then aggregated with other bit masks determined for allocation callstack for the allocation site. Aggregating the bit masks can include, for example, dual union of bit masks, bucketizing the bit masks, or the like. The aggregate bit mask is then recorded as the updated bit mask for the allocation callstack.

As an example, an allocation may include 65536 bytes, profiling each access to that memory may be more costly, e.g., require more computational resources, than what is available, wanted, etc. Accordingly, rather than store the information for each access to each byte, coarser information may be used instead. Coarser information may include, for example, dividing the total allocation into 64 byte chunks such that only the 1024 distinct chunks are tracked instead of each access to the 65536 bytes. In another example, rather than store information for each access to each byte, powers-of-two may be considered. In such an example, the system would consider whether the first 64 bytes, the first 128 bytes, the first 256 bytes, etc., were accessed. By considering only the powers-of-two, 10 unique data points for the allocation may be stored, instead of 65536. Both alternatives, e.g., coarser information and powers-of-two, provide precise information associated with the allocation but allow for the profile to be generated more often as less computational resources are required.

In block 552, if the amount of time that has lapsed is less than the threshold, a bit index may be determined. The bit index may be determined as a ration between the offset in byte to block side in byte. According to some examples, the equation for determine the bit index may be:

$$\text{bit index} = \frac{\text{offset\_in\_byte}}{\text{block\_size\_in\_byte}}$$

In some examples, the block size may be 64. The bit index may be updated to the current bit index if the current bit index is greater than the previously determined bit index.

In block 535, the bit index "i" determined in block 552 is used to set the corresponding bit to 1.

If the elapsed time is still within the threshold, in block 538, the page fault handler may re-protect the page, e.g., the trimmed cache line. In such an example, the profiler 104 may re-run to generate an updated, or additional, A/D profile for the allocation sample, e.g., return to block 420 in FIG. 4.

Figure 6:
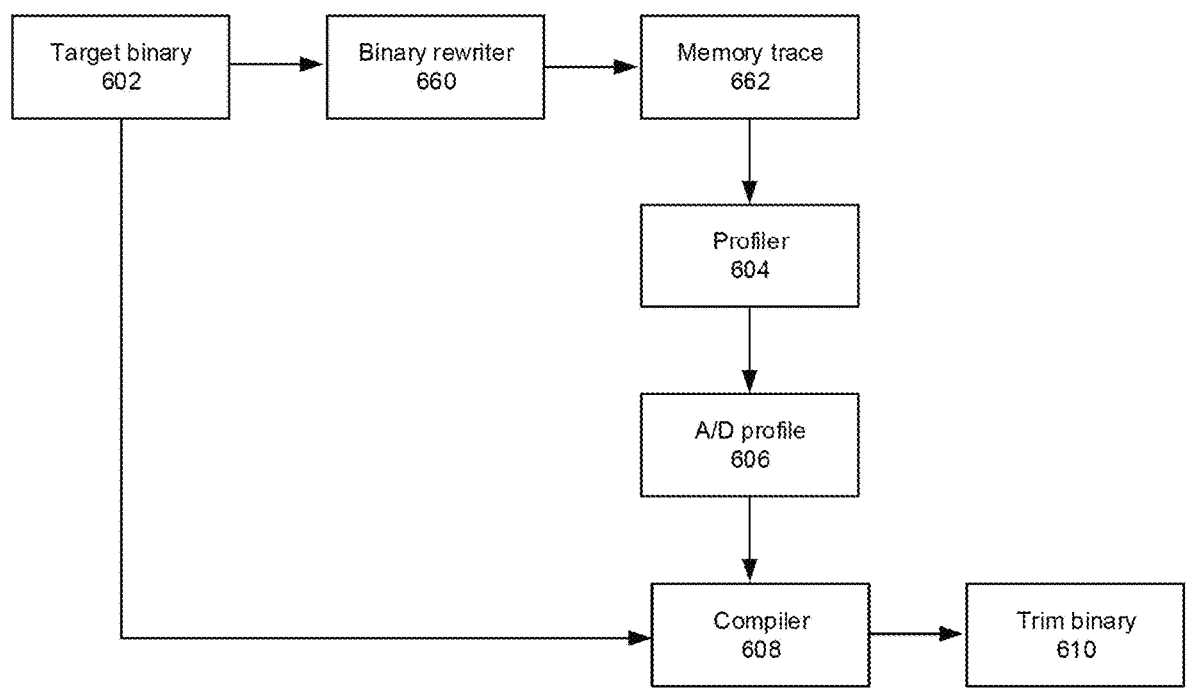
FIG. 6 is a flow diagram of an example method for trimming a binary, e.g., a binary, when profile 104 is offline according to aspects of the disclosure.

FIG. 6 is a flow diagram of an example method for trimming a binary, e.g., a binary, when the profile 104 is offline. The following operations do not have to be performed in the precise order described below. Rather, various operations can be handled in a different order or simultaneously, and operations may be added or omitted.

When the profiler is offline, the target binary 602 may be provided to a binary rewriter 660. The binary rewriter 660 may be, for example, a Dynamic RIO or PIN tool. The binary rewriter 660 is configured to collect memory traces 662 of the binary, e.g., program. The memory traces 662 include memory allocation, memory deallocation, loads, stores of the program, etc. After the memory traces 662 are collected, the memory traces 662 are provided as input into the offline profiler 604. The offline profiler 604 is configured to generate an A/D profile 606, similar to the profiler 104 described above with respect to the maximum offset profile in FIGS. 1-3 and/or the bit mask profile in FIGS. 4-5.

Similar to the method described above with respect to FIG. 1, the A/D profile 606 associated with the target binary 602 is provided as input into the compiler 608. The compiler 608 is configured to provide information through an instruction about how much of the allocation gets used. Based on the information determined by the compiler 608, the binary is optimized. When the optimized binary is run, the dead memory traffic from the affected cache lines will be trimmed 610.

Figure 7:
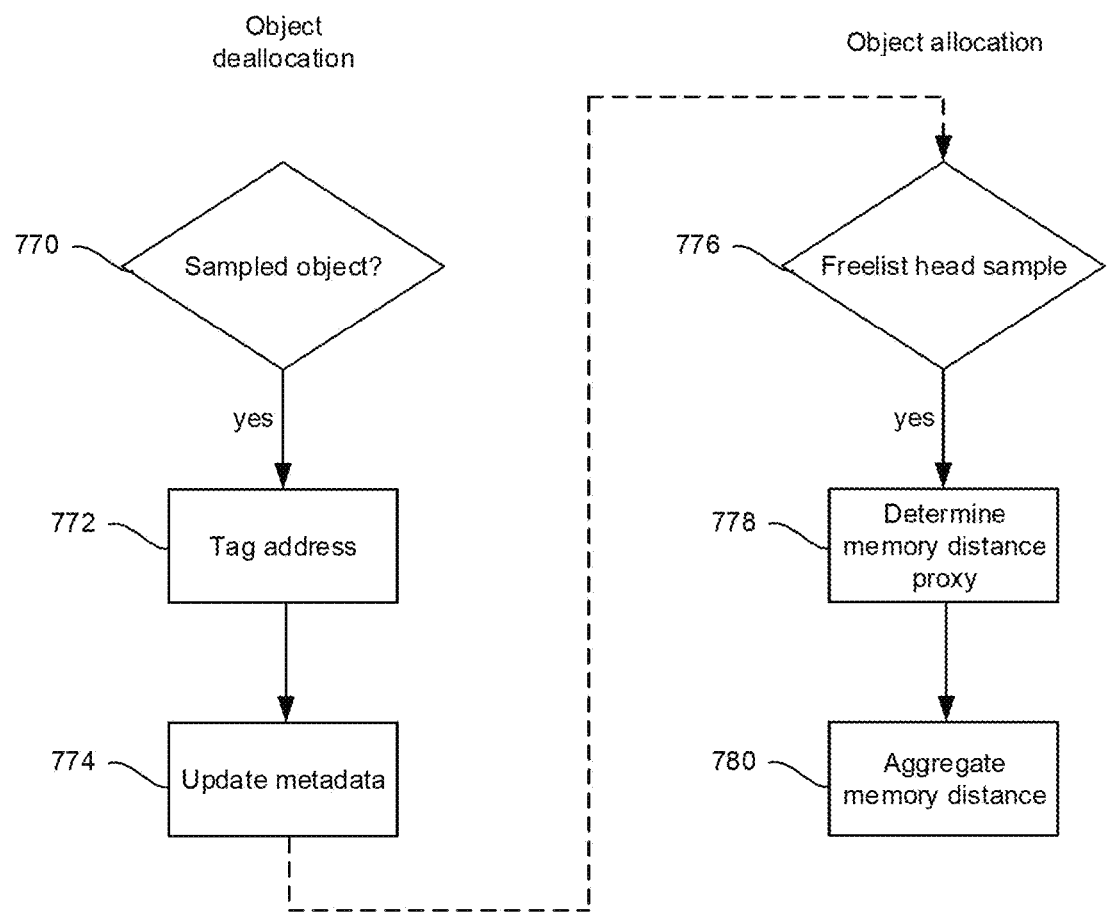
FIG. 7 is a flow diagram of example methods for allocating and deallocating objects according to aspects of the disclosure.

FIG. 7 is a flow diagram of example methods for allocating and deallocating objects. The following operations do not have to be performed in the precise order described below. Rather, various operations can be handled in a different order or simultaneously, and operations may be added or omitted.

The profiler 104, 604 (collectively referred to herein as "profiler 104") can be configured to generate a relocation distance profile. The profiler 104 may, in block 770, determine whether an object, or allocation, has been sampled. Sampled objects are examined by the profiler and unsampled objects are skipped.

If the object has been sampled, in block 772, a bit in the bit address of the object may be used as a tag to indicate that the object was sampled. In some examples, only a subset of the bits in the bit address are used by the kernel such that another subset of the bits can be used for tagging purposes. The tag indicating that the object is a sampled object may be included in one of the bits of the other subsets of bits.

After the bit address is tagged, in block 774, the metadata associated with the sampled object is updated with the time stamp of the deallocation and the cache miss hardware counter value. In some examples, the time stamp may be of a cache miss PMU event instead of the deallocation time. In another example, the time stamp may be of a first-write memory distance.

After the metadata of the object is updated, in block 776, the tagged address will be provided to the free list to be reallocated. When the head of the free list reaches the sampled object, in block 778, the memory distance proxy metric may be determined and aggregated to the deallocation site. If the head of the free list is not sampled, it is directed and/or returned for the allocation. In such an example, the head of the free list is not examined by the profiler. The sampled object is identified based on the tag in the bit address of the object. The memory distance proxy corresponds to the time between deallocation and reallocation of the object. The allocator can choose to use the sampled object as another sampling candidate or return the memory associated with the sampled object to the system and pick the next free list object. In some examples, the next free list object may be an unsampled object.

In block 780, the memory distance may be aggregated. Aggregating the memory distance may be similar to aggregating the maximum offset and/or bit masks. For example, aggregating the memory distance may include, for example, merging the memory distance by taking the mean, medium, mode, or the like. In some examples, the aggregate memory distance is a running average, medium, or a histogram of the memory distance for the allocation callstack. The aggregate memory distance is then recorded as the updated memory distance for the allocation callstack.

Example Systems

Figure 8:
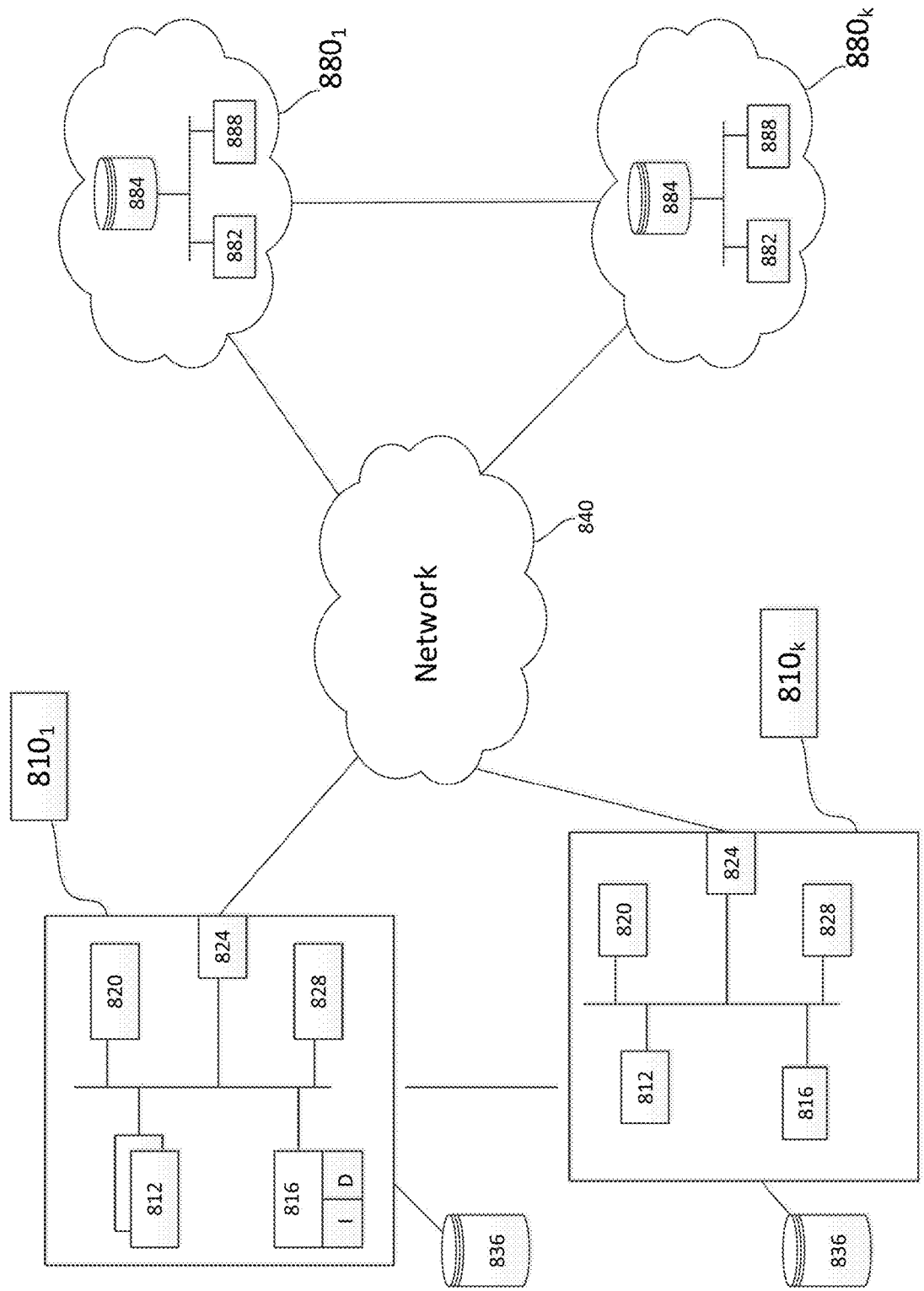
FIG. 8 is a block diagram of an example computing environment according to aspects of the disclosure.

FIG. 8 illustrates an example computing system 800. System 800 includes one or more computing devices 810, which may comprise computing devices 8101 through 810k, storage 836, a network 840 and one or more cloud computing systems 880, which may comprise cloud computing systems 8801 through 880p. Computing devices 810 may include computing devices located at a customer location that make use of cloud computing services such as Infrastructure as a Service (IaaS), Platform as a Service (PaaS), and/or Software as a Service (SaaS). For example, if a computing device 810 is located at a business enterprise, computing device 810 may use cloud systems 880 as a service that provides software applications (e.g., accounting, word processing, inventory tracking, etc., applications) to computing devices 810 used in operating enterprise systems. In addition, computing device 810 may access cloud computing systems 880 as part of its operations that employ machine learning, or more generally artificial intelligence technology, to train applications that support its business enterprise.

As shown in FIG. 8, each of computing devices 810 may include one or more processors 812, memory 816 storing data 834 and instructions 832, display 820, communication interface 824, and input system 828. The processors 812 and memories 816 may be communicatively coupled as shown in FIG. 8 and include memory controllers, queues, a prefetch engine, and/or hint table mechanisms described above.

Computing device 810 may also be coupled or connected to storage 836, which may comprise local or remote storage, e.g., on a Storage Area Network (SAN), that stores data accumulated as part of a customer's operation. Computing device 810 may comprise a standalone computer (e.g., desktop or laptop) or a server associated with a customer. A given customer may also implement, as part of its business, multiple computing devices as servers. Memory 816 stores information accessible by the one or more processors 812, including instructions 832 and data 834 that may be executed or otherwise used by the processor(s) 812. The memory 816 may be of any type capable of storing information accessible by the processor, including a computing device-readable medium, or other medium that stores data that may be read with the aid of an electronic device, such as a hard drive, memory card, ROM, RAM, DVD, or other optical disks, as well as other write-capable and read-only memories. Systems and methods may include different combinations of the foregoing, whereby different portions of the instructions and data are stored on different types of media.

The instructions 832 may be any set of instructions to be executed directly (such as machine code) or indirectly (such as scripts) by the processor 812. For example, the instructions may be stored as computing device code on the computing device-readable medium. In that regard, the terms "instructions" and "programs" may be used interchangeably herein. The instructions may be stored in object code format for direct processing by the processor, or in any other computing device language, including scripts or collections of independent source code modules that are interpreted on demand or compiled in advance. Processes, functions, methods, and routines of the instructions are explained in more detail below.

The data 834 may be retrieved, stored, or modified by processor 812 in accordance with the instructions 832. As an example, data 834 associated with memory 816 may comprise data used in supporting services for one or more client devices, applications, etc. Such data may include data to support hosting web-based applications, file share services, communication services, gaming, sharing video or audio files, or any other network-based services.

The one or more processors 812 may be any conventional processor, such as commercially available CPUs. Alternatively, the one or more processors may be a dedicated device such as an ASIC, e.g., a tensor processing unit (TPU), or other hardware-based processor. Although FIG. 8 functionally illustrates the processor, memory, and other elements of computing device 810 as being within the same block, it will be understood by those of ordinary skill in the art that the processor, computing device, or memory may actually include multiple processors, computing devices, or memories that may or may not be located or stored within the same physical housing. In one example, one or more computing devices 810 may include one or more server computing devices having a plurality of computing devices (e.g., a load-balanced server farm) that exchange information with different nodes of a network for the purpose of receiving, processing, and transmitting the data to and from other computing devices as part of customer's business operation.

Computing device 810 may also include a display 820 (e.g., a monitor having a screen, a touch-screen, a projector, a television, or other device that is operable to display information) that provides a user interface that allows for controlling the computing device 810. Such control may include, for example, using a computing device to cause data to be uploaded through input system 828 to cloud system 880 for processing, causing accumulation of data on storage 836, or more generally, managing different aspects of a customer's computing system. While input system 828 may be used to upload data, e.g., a USB port, computing system 880 may also include a mouse, keyboard, touchscreen, or microphone that can be used to receive commands and/or data.

The network 840 may include various configurations and protocols including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi, HTTP, etc., and various combinations of the foregoing. Such communication may be facilitated by any device capable of transmitting data to and from other computing devices, such as modems and wireless interfaces. Computing device 810 interfaces with network 840 through communication interface 824, which may include the hardware, drivers, and software necessary to support a given communications protocol.

Cloud computing systems 880 may comprise one or more data centers that may be linked via high speed communications or computing networks. A given data center within system 880 may comprise dedicated space within a building that houses computing systems and their associated components, e.g., storage systems and communication systems. Typically, a data center will include racks of communication equipment, servers/hosts, and disks. The servers/hosts and disks comprise physical computing resources that are used to provide virtual computing resources such as VMs. To the extent that a given cloud computing system includes more than one data center, those data centers may be at different geographic locations within relatively close proximity to each other, chosen to deliver services in a timely and economically efficient manner, as well as provide redundancy and maintain high availability. Similarly, different cloud computing systems are typically provided at different geographic locations.

As shown in FIG. 8, computing system 880 may include infrastructure 882, storage 884 and computer system 888. Infrastructure 882, storage 884 and computer system 888 may comprise a data center within a cloud computing system 880. Infrastructure 882 may comprise servers, switches, physical links (e.g., fiber), and other equipment used to interconnect servers within a data center with storage 884 and computer system 888. The servers may be equipped with the components that make up computing device 800 or 810. Storage 884 may comprise a disk or other storage device that is partitionable to provide physical or virtual storage to virtual machines running on processing devices within a data center. Storage 884 may be provided as a SAN within the datacenter hosting the virtual machines supported by storage 884 or in a different data center that does not share a physical location with the virtual machines it supports. Computer system 888 acts as supervisor or managing agent for jobs being processed by a given data center. In general, computer system 888 will contain the instructions necessary to, for example, manage the operations requested as part of a synchronous training operation on customer data. Computer system 888 may receive jobs, for example, as a result of input received via an application programming interface (API) from a customer.

Example Methods

Figure 9:
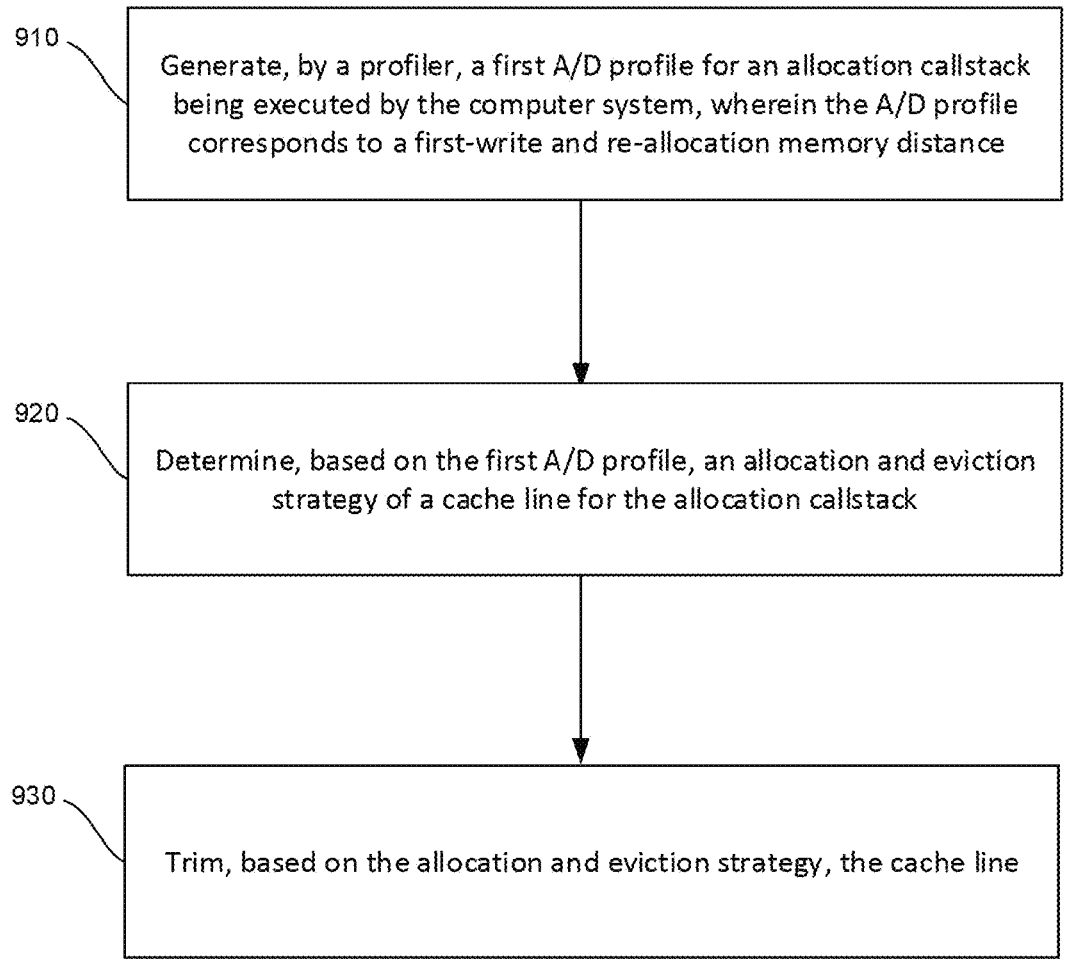
FIG. 9 is a flow diagram of an example method for trimming a cache line based on an allocation and eviction strategy according to aspects of the disclosure.

FIG. 9 is a flow diagram for an example method for trimming a cache line based on an allocation and eviction strategy. The following operations do not have to be performed in the precise order described below. Rather, various operations can be handled in a different order or simultaneously, and operations may be added or omitted.

In block 910, a first A/D profile for an allocation callstack being executed by the computer system is generated by a profile. The A/D profile corresponds to a first-write and re-allocation memory distance. Generating the first A/D profile comprises receiving an allocation sample associated with the allocation callstack. A time stamp for the allocation sample is recorded.

In block 920, an allocation and eviction strategy of a cache line for the allocation callstack is determined based on the first A/D profile.

In block 930, the cache line is trimmed based on the allocation and eviction strategy.

According to some examples, a maximum offset corresponding to a maximum number of blocks initialized during a threshold period of time is determined. An allocated region of the cache line comprises an initial number of blocks. Trimming the cache line, based on the allocation and eviction strategy, includes allocating a trimmed number of blocks in cache, without reading from main memory, after allocation and evicting a number of blocks after deallocation without main memory writeback. According to some examples, trimming the cache line includes trimming the initial number of blocks to the maximum number of blocks by allocating a number of blocks in the cache without reading from main memory.

In examples where a maximum offset is determined, a memory page is protected, and a page fault handler is installed. Upon execution of an application accessing the cache, the memory page is unprotected. A current timestamp is compared with the recorded timestamp to determine a lapsed period of time. The current timestamp may correspond to when the application is executed such that the cache is accessed. When the lapsed period of time is greater than a threshold, the maximum number of bytes is recorded by aggregating. When the lapsed period of time is less than the threshold, a second A/D profile for the allocation callstack is generated. Generating the second A/D profile for the allocation callstack comprises determining an updated maximum offset, re-protecting the memory page, and re-installing the page fault handler. According to some examples, one or more additional A/D profiles for the allocation callstack are generated. Each of the additional A/D profiles includes the maximum number of blocks initialized during a threshold period of time. The maximum number of blocks for the first A/D profile and the respective maximum number of blocks for the additional A/D profiles are aggregated.

In another example, a bitmask for the allocation sample is determined. A bit in the bitmask corresponds to one cache line per allocation. To determine the bitmask for the allocation sample, a first-write distance for a byte block in a memory region is identified. One bit in the bitmask for each byte block is then allocated. The first-write distance corresponds to a number of cache lines accessed by an application before a first-write of a block since receiving the allocation sample. The allocated region comprises an initial number of blocks. The initial number of blocks is trimmed, based on the bitmask, to a reduced number of blocks.

In examples where a bitmask is determined, a memory page is protected, and a page fault handler is installed. Upon execution of an application accessing the cache, the memory page is unprotected. A current timestamp is compared with the recorded timestamp to determine a lapsed period of time. The current timestamp may correspond to when the application is executed such that the cache is accessed. When the lapsed period of time is greater than a threshold, the bitmask is recorded by aggregating. When the lapsed period of time is less than the threshold, a bit index is determined. According to some examples, additional A/D profiles for the allocation callstack may be generated. Each of the additional A/D profiles includes a respective bitmask. The bitmask for the first A/D profile and the respective bitmasks for the additional A/D profiles may be aggregated.

According to some examples, an allocation sample associated with an allocation callstack may be received. A tag may be associated with the allocation sample using a bit in the bit address of the allocation sample. The tag may indicate that the allocation was sampled. The metadata associated with the sampled allocation sample may be updated. The metadata may be updated to include a cache miss counter value or a timestamp of when the allocation is deallocated. The tagged bit address may be provided to a free list to be reallocated. A memory distance proxy metric may be determined and aggregated to a deallocation site. The memory distance proxy corresponds to a time between deallocation and reallocation of the allocation sample.

Aspects of this disclosure can be implemented in digital electronic circuitry, in tangibly-embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus.

The term "configured" is used herein in connection with systems and computer program components. For a system of one or more computers to be configured to perform particular operations or actions means that the system has installed on its software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" refers to data processing hardware and encompasses various apparatus, devices, and machines for processing data, including programmable processors, a computer, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a stand-alone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process that is programmed to perform one or more specific functions. The engine can be implemented as one or more software modules or components, or can be installed on one or more computers in one or more locations. A particular engine can have one or more computers dedicated thereto, or multiple engines can be installed and running on the same computer or computers.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers.

A computer or special purposes logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A method for managing utilization of a cache within a computer system comprising a plurality of processors, the method comprising:
   generating, by a profiler executed by one or more processors, a first allocation/deallocation (A/D) profile for an allocation callstack being executed by the computer system, wherein the first A/D profile corresponds to a first-write and re-allocation memory distance;
   determining, by the one or more processors based on the first A/D profile, an allocation and eviction strategy of a cache line for the allocation callstack; and
   trimming, by the one or more processors based on the allocation and eviction strategy, the cache line.

2. The method of claim 1, wherein generating the first A/D profile further comprises:
   receiving, by the one or more processors, an allocation sample associated with the allocation callstack;
   recording, by the one or more processors based on the allocation sample, a timestamp; and
   determining, by the one or more processors, a maximum offset corresponding to a maximum number of blocks initialized during a threshold period of time.

3. The method of claim 2, wherein:
   an allocated region of the cache line comprises an initial number of blocks, and
   trimming, by the one or more processors, the initial number of blocks to the maximum number of blocks by allocating a number of blocks without reading from main memory.

4. The method of claim 2, further comprising:
   protecting, by the one or more processors, a memory page; and
   installing, by the one or more processors, a page fault handler.

5. The method of claim 4, further comprising:
   unprotecting, by the one or more processors upon execution of an application accessing the cache, the memory page;
   comparing, by the one or more processors, a current timestamp with the recorded timestamp to determine a lapsed period of time; and
   when the lapsed period of time is greater than a threshold, recording by aggregating, by the one or more processors, the maximum number of blocks, or
   when the lapsed period of time is less than the threshold, generating, by the one or more processors, a second A/D profile for the allocation callstack.

6. The method of claim 5, wherein generating the second A/D profile for the allocation callstack, further comprises:
   determining, by the one or more processors, an updated maximum offset;
   re-protecting, by the one or more processors, the memory page; and
   re-installing, by the one or more processors, the page fault handler.

7. The method of claim 5, further comprising:
   generating, by the profiler executed by the one or more processors, one or more additional A/D profiles for the allocation callstack, each of the one or more additional A/D profiles including the maximum number of blocks initialized during a threshold period of time; and
   aggregating, by the one or more processors, the maximum number of blocks for the first A/D profile and the respective maximum number of blocks for the one or more additional A/D profiles.

8. The method of claim 1, wherein generating the A/D profile further comprises:
   receiving, by the one or more processors, an allocation sample associated with an allocation callstack;
   recording, by the one or more processors based on the allocation sample, a timestamp; and
   determining, by the one or more processors, a bitmask for the allocation sample.

9. The method of claim 8, wherein:
   a bit in the bitmask corresponds to one cache line per allocation; and
   determining the bitmask for the allocation sample comprises:
      identifying, by the one or more processors, a first-write distance for a byte block in a memory region; and
      allocating, by the one or more processors, one bit in the bitmask for each byte block.

10. The method of claim 9, wherein the first-write distance corresponds to a number of cache lines accessed by an application before a first-write of a block since receiving the allocation sample.

11. The method of claim 8, wherein:
   an allocated region of the cache line comprises an initial number of blocks, and
   trimming the cache line comprises trimming, by the one or more processors based on the bitmask, the initial number of blocks to a reduced number of blocks.

12. The method of claim 8, further comprising:
protecting, by the one or more processors, a memory page; and
installing, by the one or more processors, a page fault handler.

13. The method of claim 12, further comprising:
unprotecting, by the one or more processors upon execution of an application accessing the cache, the memory page;
comparing, by the one or more processors, a current timestamp with the recorded timestamp to determine a lapsed period of time; and
when the lapsed period of time is greater than a threshold, recording, by the one or more processors, the bitmask, or
when the lapsed period of time is less than the threshold, determine, by the one or more processors, a bit index.

14. The method of claim 13, further comprising:
generating, by the profiler executed by the one or more processors, one or more additional A/D profiles for the allocation callstack, each of the one or more additional A/D profiles including a respective bitmask; and
aggregating, by the one or more processors, the bitmask for the first A/D profile and the respective bitmasks for the one or more additional A/D profiles.

15. The method of claim 1, further comprising:
receiving, by the one or more processors, an allocation sample associated with an allocation callstack;
associating, by the one or more processors using a bit in a bit address of the allocation sample, a tag with the allocation sample, the tag indicating the allocation was sampled;
updating, by the one or more processors, metadata associated with the sampled allocation sample; and
providing, by the one or more processors, the tagged bit address to a free list to be reallocated.

16. The method of claim 15, wherein the metadata is updated to include a cache miss counter value or a timestamp of when the allocation is deallocated.

17. The method of claim 15, further comprising:
determining, by the one or more processors, a memory distance proxy metric; and
aggregating, by the one or more processors, the memory distance proxy metric to a deallocation site.

18. The method of claim 17, wherein the memory distance proxy metric corresponds to a time between deallocation and reallocation of the allocation sample.

19. A system, comprising:
one or more processors, the one or more processors configured to:
generate, by executing a profiler, a first allocation/deallocation (A/D) profile for an allocation callstack being executed by a computer system, wherein the first A/D profile corresponds to a first-write and re-allocation memory distance;
determine, based on the first A/D profile, an allocation and eviction strategy of a cache line for the allocation callstack; and
trim, based on the allocation and eviction strategy, the cache line.

20. One or more non-transitory computer-readable storage media encoding instructions that, when executed by one or more processors, cause the one or more processors to perform operations comprising:
generating, using a profiler, a first allocation/deallocation (A/D) profile for an allocation callstack being executed by a computer system, wherein the first A/D profile corresponds to a first-write and re-allocation memory distance;
determining, based on the first A/D profile, an allocation and eviction strategy of a cache line for the allocation callstack; and
trimming, based on the allocation and eviction strategy, the cache line.

* * * * *